United States Patent [19]

Weisburn et al.

[11] Patent Number: 5,551,560
[45] Date of Patent: Sep. 3, 1996

[54] CONTAINER FOR COMPACT DISC AND JEWEL BOX

[75] Inventors: James T. Weisburn, Massillon; Bruce C. Straslicka, Medina, both of Ohio

[73] Assignee: Alpha Enterprises, Inc., North Canton, Ohio

[21] Appl. No.: 268,317

[22] Filed: Jun. 30, 1994

[51] Int. Cl.$^6$ .............................. B65D 85/30; B65D 85/57
[52] U.S. Cl. .................................... 206/310; 206/308.1
[58] Field of Search ............................ 206/309, 310, 206/308.1, 312, 472

[56] References Cited

U.S. PATENT DOCUMENTS

| | | | |
|---|---|---|---|
| 4,084,690 | 4/1978 | Pulse | 206/310 |
| 4,184,594 | 1/1980 | Hahn | 206/387 |
| 4,508,822 | 7/1986 | Hemmings | 206/472 X |
| 4,613,044 | 9/1986 | Saito et al. | 206/444 |
| 4,623,062 | 11/1986 | Chase et al. | 206/311 |
| 4,778,051 | 10/1988 | Schaub et al. | 206/472 X |
| 4,874,085 | 10/1989 | Grobackar et al. | 206/309 |
| 4,903,829 | 2/1990 | Clemens | 206/310 |
| 4,905,217 | 2/1990 | King et al. | 206/312 X |
| 5,044,497 | 9/1991 | Weisburn et al. | 206/387 |
| 5,263,580 | 11/1993 | Ciba et al. | 206/308.1 |

*Primary Examiner*—B. Dayoan
*Attorney, Agent, or Firm*—Sand & Sebolt

[57] ABSTRACT

A storage container for removably holding a disc within a storage compartment of the container, wherein the information containing area of the disc is free of contact with the container. A plurality of support ribs are formed on a base of the container and have shelves parallel with the base for contacting a non information containing peripheral edge of the disc, to support the disc in a spaced relationship from the base. A post is formed with an undercut for releasably capturing an edge of the disc therein. An outwardly projecting tab is formed on an elongated panel of a double hinged panel assembly which pivotally mounts a closure lid on the base of the container. The tab clamps against the peripheral edge of the disc when the lid is closed to immovably secure the disc within the storage compartment, on a first pair of adjacent ribs and on a second pair of ribs located diametrically from the first pair of ribs.

12 Claims, 2 Drawing Sheets

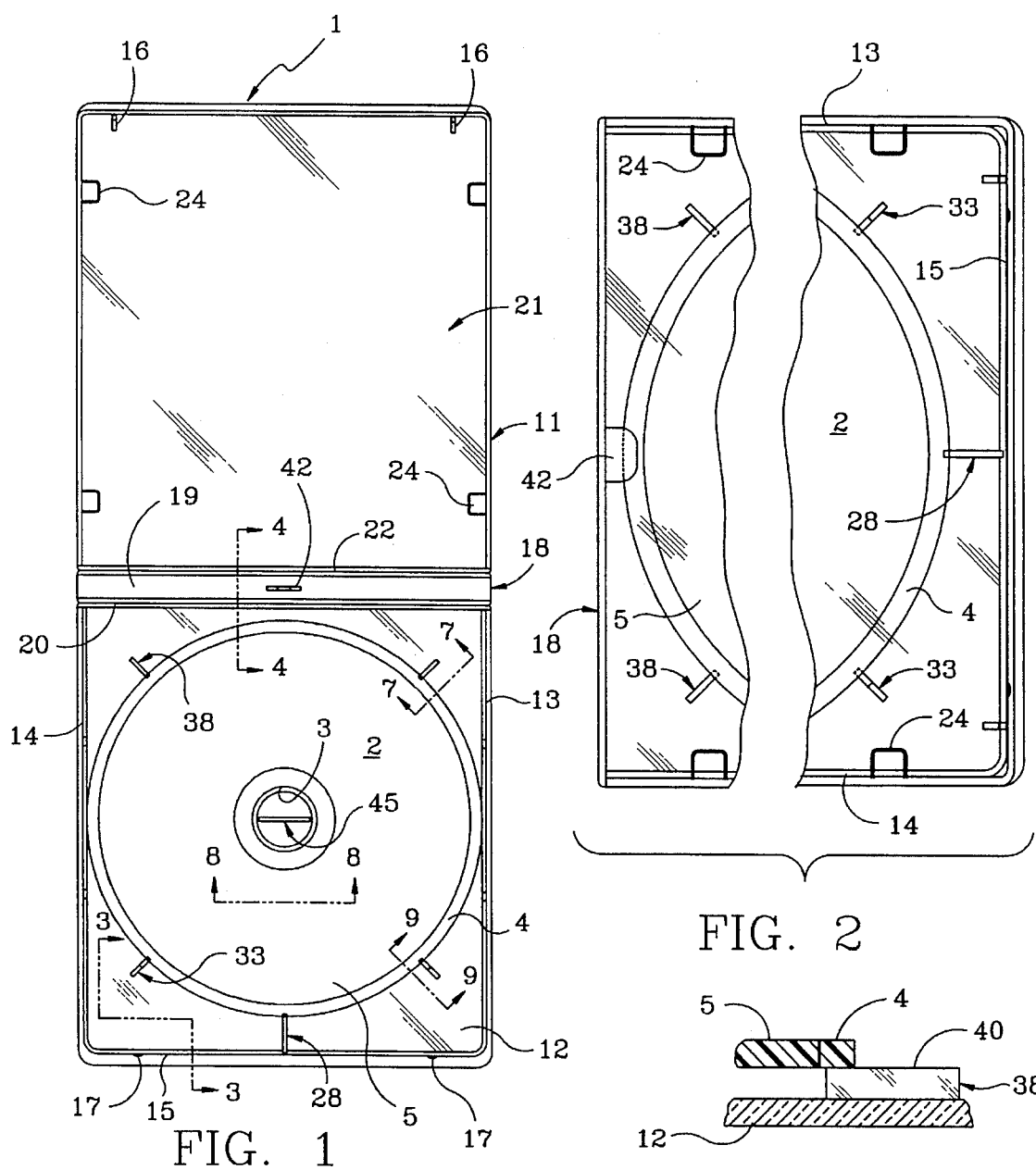
FIG. 1
FIG. 2
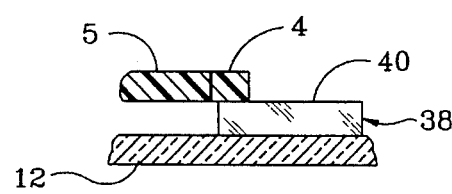
FIG. 7
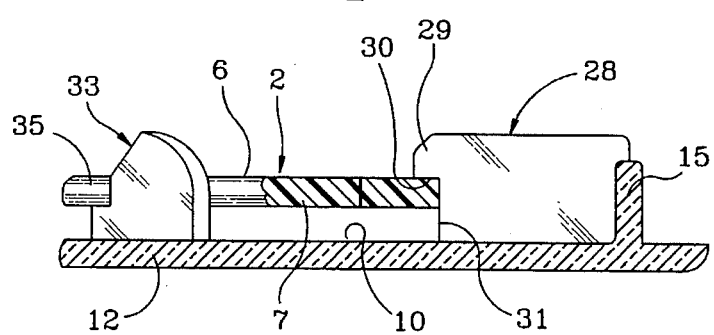
FIG. 3
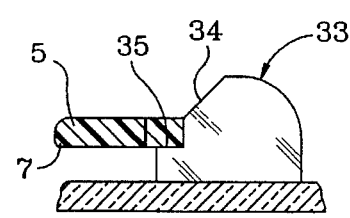
FIG. 9

5,551,560

CONTAINER FOR COMPACT DISC AND JEWEL BOX

BACKGROUND OF THE INVENTION

1. Technical Field

The present invention relates to a storage container for a disc-shaped member which contains electronic readable information thereon, such as compact discs (CDs) or optically readable video discs. More particularly, the invention relates to a container which stores the disc within the container by gripping and supporting a peripheral edge of the disc which is free of recorded information, without any contact of the disc surface which contains the recorded information. Even more particularly, the invention relates to such a container in which the disc is easily placed within the container and automatically trapped therein upon movement of a closure lid into a closed latched position.

2. Background Information

Various discs, usually formed of a synthetic plastic material, such as CDs and video discs, contain stored information on one or more surfaces of the discs and have a peripheral edge free of information. These discs usually have a center hole which is utilized when the disc is inserted into a player for retrieving the information stored on the disc surface. Various containers have been developed for storing and displaying these discs which prevent damage to the disc and which eliminate or reduce contact with the information containing areas thereof.

Most of these known storage containers support the disc within the container by a raised center hub which extends through the center opening of the disc. Examples of known prior art disc storage containers are shown in U.S. Pat. Nos. 4,623,062, 4,903,829, 4,874,085, 4,613,044, and 4,084,690. Although these containers do perform satisfactory for their intended purpose, they do not provide adequate support for the edges of the disc and rely primarily on the support at the center of the disc.

Another type of disc storage container has a plurality of support posts which are formed with slots which trap the peripheral edges of the discs within the slots, which slots are usually located diagrammatically opposite of each other. However, this requires that the disc be flexed or bent slightly in order for the disc to be popped into and removed from the trapping notches. Such repeated flexing of the disc is undesirable if it can be avoided. It also may be more difficult than the center post mounted disc storage containers to place the disc in the storage container.

Therefore, the need exists for an improved disc storage container which securely holds the disc within the container without any contact of the information bearing containing surfaces, and which enables the easy insertion and removal of the disc from the storage compartment without flexing or bending of the disc.

SUMMARY OF THE INVENTION

Objectives of the invention include providing an improved disc storage container which can be formed relatively inexpensively as a one-piece plastic injection molded member, and which can be formed of a transparent plastic material to enable the disc label to be read through the container walls.

A further objective of the invention is to provide such a disc storage container which securely holds the disc within the storage compartment by supporting a plurality of spaced areas of the non information bearing peripheral edge of the disc to maintain the disc above and out of contact with the base of the container.

Another objective is to provide such a disc storage container which is relatively unaffected by variations in sizes of the center opening of the disc, and in which a plurality of supporting ribs are formed with shelves which support the peripheral edge of the disc, and which also will be unaffected by minor manufacturing differences.

A still further objective of the invention is to provide such a disc storage container in which the disc is automatically clamped and secured in a stored position upon closure of the lid into its locked position without requiring any other manipulation of the disc once it is placed onto the supporting shelves of the container ribs.

Still another objective of the invention is to provide such a disc storage container which is of a simple, rugged and inexpensive construction, and which achieves the stated objectives in a simple, effective and efficient manner.

These objectives and advantages are obtained by the improved disc storage container of the invention, the general nature of which may be stated as including a housing having a base and a closure lid forming a storage compartment therebetween; protrusion means formed on the housing and extending into the storage compartment for engaging portions of the peripheral edge of a disc to be stored therein; and tab means formed on the lid for engaging the peripheral edge of the disc when the lid is in a closed position on the base to immovably secure the disc in the storage compartment on the protrusion means without any contact of an information containing surface of the disc.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

FIG. 1 is a plan view of the improved disc storage container in full open position having a disc mounted in the base thereof;

FIG. 2 is an enlarged fragmentary sectional view of the diametrically opposed lid clamping tab and the undercut base rib of the storage container shown in FIG. 1, with the lid in fully closed position;

FIG. 3 is an enlarged fragmentary sectional view taken on line 3—3, FIG. 1;

FIG. 7 is an enlarged fragmentary sectional view taken on line 7—7, FIG. 1;

FIG. 9 is an enlarged fragmentary sectional view taken on line 9—9, FIG. 1.

Similar numerals refer to similar parts throughout the drawings.

DESCRIPTION OF THE PREFERRED EMBODIMENT

Figure 4:
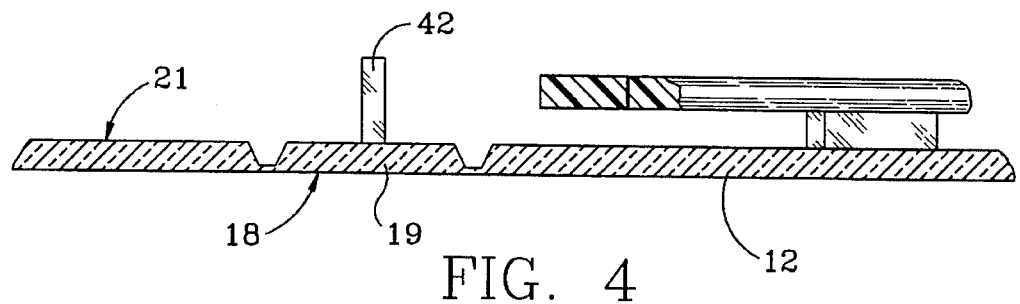
FIG. 4 is an enlarged fragmentary sectional view taken on line 4—4, FIG. 1.
Figure 5:
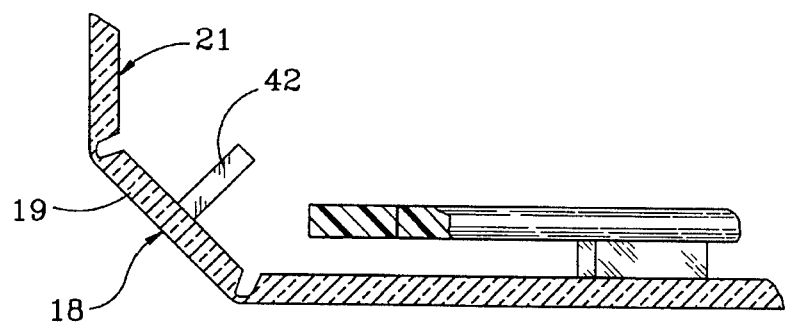
FIGS. 5 and 6 are enlarged fragmentary sectional views similar to FIG. 4, showing the lid of the security case in an intermediate and closed position, respectively.

The improved storage container of the invention is indicated generally at 1, and is shown in FIG. 1 in a full open position with a disc 2 shown supported therein. Disc 2 is preferably formed of a synthetic material and contains a usual center opening 3 and an outer annular peripheral edge 4 which is free of stored information. An annular surface 5 which is located between center opening 3 and edge 4 contains the recorded information. The disc will have top and bottom surfaces 6 and 7 (FIG. 3), either one or both of which, will contain the stored information. These discs have high storage density, for an example, an optically-readable video disc or an optically-readable digital record, hereinafter referred to as a compact disc or CD.

Container 1 has a rectangular box-shaped configuration and when closed forms a hollow enclosure or interior storage container 10. Container 1 includes a housing indicated generally at 11, having a rectangular-shaped bottom wall or base 12 with upstanding parallel sidewalls 13 and 14 and an end wall 15, which walls are arranged in a U-shaped configuration to enclose three sides of the housing. Walls 13, 14 and 15 preferably are formed integrally with base 12 and preferably are positioned inwardly a short distance from the outer edges of base 2 to form an outer exposed U-shaped portion extending between the walls and outer edges of base 2.

A usual double hinge panel assembly 18, which includes an elongated rectangular-shaped panel 19, is connected to the inner edge of base 12 by a hinge strip 20 and to a lid 21 by a second hinge strip 22. Hinges 20 and 22 preferably are relatively thinner strips of plastic material which are integrally molded with lid 21, panel 19 and base 12, and are referred to as "living hinges". Lid 21 preferably is provided with four offset projections 24 which are spaced from the inner surface of lid 21 for receiving and holding printed materials describing the contents of disc placed in the storage container. A pair of usual latching projections 16 are formed on the free end of lid 21 and engage usual latching nubs 17 formed on end wall 15 of base 12 to latch lid 21 in a closed position.

The above described construction and features of storage container 10 are well known in the art and may be modified without affecting the invention.

In accordance with the invention, a post or protrusion 28 (FIGS. 1–3) iS molded integrally with end wall 15 and base 12 and extends upwardly and inwardly into storage container 10. Post 28 includes a sloped overhanging top edge 29 which forms an undercut 30 extending at a right angle with a vertical front edge 31. A pair of ribs 33 (FIGS. 1, 3 and 9) are located on opposite sides of post 28 and are formed integrally with base 12 and extend vertically upwardly therefrom to limit the movement of disc 2 in a direction generally parallel with base 12. Each rib 33 includes a sloped front edge 34 which forms an inwardly extending right angled shelf or support ledge 35 (FIG. 9). Ribs 33 are spaced approximately 90° from each other and 45° from post 28.

Another pair off, ribs, each indicated generally at 38 (FIGS. 1, 2 and 7), is formed integrally with base 12 and projects vertically upwardly therefrom and is located generally adjacent hinge 2O diametrically opposite of ribs 33. Each rib 38 has a flat top edge 40 which lies in a common horizontal plane spaced above and preferably parallel with the plane of base 12, and in alignment with shelves 35 of ribs 33, and with undercut 30 of post 28. Ribs 33 and 38 preferably are spaced 90° from each other as shown in FIG. 1.

Figure 8:
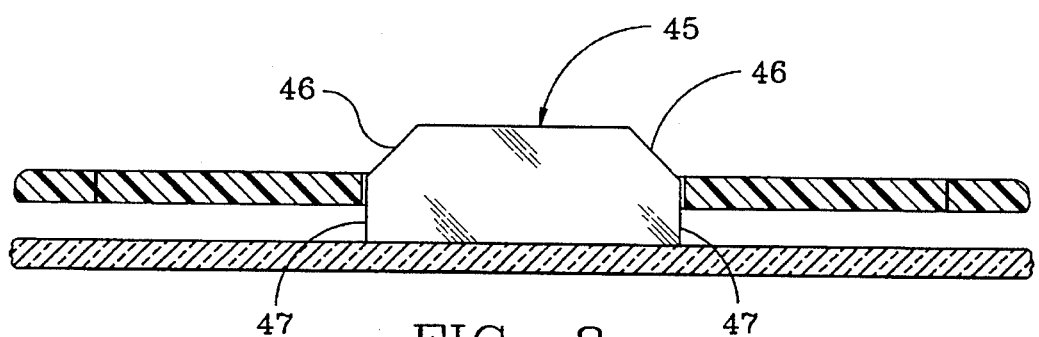
FIG. 8 is an enlarged fragmentary sectional view taken on line 8—8, FIG. 7.

A centering rib 45 is formed integrally with base 12 and extends vertically Upwardly therefrom (FIGS. 1 and 8) and has a pair of sloped upper edges 46 and a pair of vertical end edge 47. Rib 45 is adapted to project through center hole 3 of disc 2 to properly position the disc within storage container 10 without providing any support for the disc.

Post 28 and ribs 33 and 38 will support disc 2 above base 12 in parallel alignment therewith. In accordance with one of the features of the invention, the inwardly extending length of undercut 30 and or shelves 35 are slightly less than the width of peripheral edge 4 to prevent contact with information bearing annular portion 5. A disc is placed easily in storage compartment 10 by inserting edge 4 beneath undercut 30 and then permitting the disc to slide along front edges 34 of ribs 33 and along sloped edges 46 of centering rib 45, and then onto shelves 40 of ribs 38 and shelves 35 of ribs 33, which in combination with center rib 45 properly positions the disc within the storage compartment.

Figure 6:
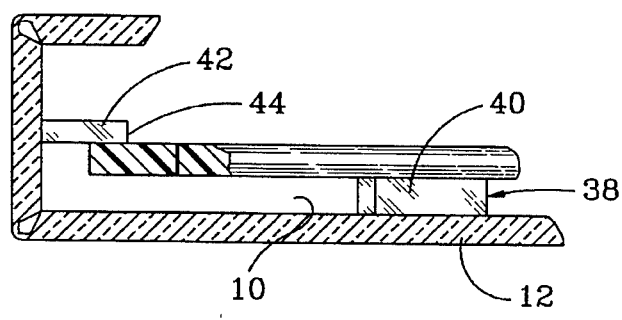

Lid 21 is then moved into the latched position as shown in FIGS. 2 and 6, by the folding movement on hinges 20 and 22 until latch projections 16 engage latch nubs 17 in a usual manner as is common with various types of plastic storage containers for cassettes.

In accordance with the invention, an upstanding tab 42 (FIGS. 1 and 4) is formed integrally with hinge panel 19 and extend outwardly therefrom. Tab 42 extends in a horizontal direction with respect to base 12 and a stored disc 2 when lid 21 is in the closed position as shown in FIGS. 2 and 6, wherein its outer end 44 extend partially over peripheral edge 4 of disc 2 and clamps the disc against shelf 40 as shown in FIG. 6 and shelf 35 as shown in FIG. 9, and traps an opposite portion thereof in undercut 30 as shown in FIG. 9.

Thus, when lid 21 is in the closed position, disc 2 is securely retained within storage compartment 10 by the trapping of one edge portion of the disc beneath undercut 30, in combination with the clamping of outer portions of edge 4 on ribs 38 and ribs 33 by tab 42. Ribs 33 in combination with centering rib 45 prevent any sliding movement of the disc with respect to ribs 38 without trapping or clamping of the peripheral edge thereon.

As shown in FIGS. 3 and 9, front edges 29 and 34 of ribs 28 and 33 preferably are sloped to permit the easy insertion of disc edge 4 into undercut 30, and function as guides for guiding the disc edge. Disc 2 is removed easily from storage container 10 of housing 11 by unlatching latch members 16 and 17 and moving lid 21 to either a partial or full open position sufficient to remove the clamping engagement of tab 42 with disc 2. A user then by merely spreading his or her hands can grasp the disc edge and lift the disc upwardly which will slightly pivot the disc about undercut 30, afterwhich the disc merely slides out of its trapped engagement beneath undercut 30 for complete removal from the storage compartment without any flexing of the disc as required in other prior art containers.

Preferably container 1 is formed of a single one-piece member including the various posts, hinges, ribs and latch members, preferably of a plastic material such as polypropylene, which is substantially transparent thereby enabling a viewer to easily read the printed indicia on the disc or on a graphic sheet stored in lid 21 by projections 24, so as to know the disc contents without opening of lid 21 or removal of the discs from the storage compartment.

It is readily understood that the ribs 33 and 38 can have other configurations than that shown in the drawings and described. Likewise trapping post 28 and tab 42, can have different orientations within the storage compartment than that shown in the drawings. For example, post 28 could be mounted entirely on the base or on end wall 15 instead of extending therebetween as shown in FIG. 3, again without affecting the concept of the invention and the results achieved thereby.

Accordingly, the improved container provides a construction which is effective, safe, inexpensive, efficient in assembly, operation and use and which achieves all of the enumerated objectives, provides for eliminating difficulties in prior disc storage containers and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved disc storage container is constructed and used, the characteristics of the construction, and the advantageous, new and useful results obtained; the new and useful structures, devices, elements, arrangements, parts and combinations, are set forth in the appended claims.

We claim:

1. A storage container for a disc which contains recorded information on at least one surface thereof, and a peripheral edge, said container including:

a housing having a base and a closure lid forming a storage compartment therebetween;

hinge means for movably mounting the lid on the base for movement between open and closed positions;

rib means formed on the housing and extending into the storage compartment for supporting a first portion of the peripheral edge of a disc to be stored therein;

post means formed on the housing, said post means includes a post formed with an undercut for trapping a second portion of the peripheral edge of the disc under the undercut; and tab means formed on the hinge means for engaging a third portion of the peripheral edge of the disc when the lid is in the closed position on the base, and in combination with the post means and rib means, secure the disc in the storage compartment.

2. The storage container defined in claim 1 in which mutually engageable latch means is formed on the lid and base for releasably securing the lid in the closed position.

3. The storage container defined in claim 1 in which the tab means and post means lie substantially diametrically opposite of each other.

4. The storage container defined in claim 1 in which the hinge means is a double hinged panel assembly including an elongated panel and a pair of flexible hinge strips pivotally connecting the panel to the base and lid; and in which the tab means includes a tab mounted on the elongated panel and extending outwardly therefrom.

5. The storage container defined in claim 4 in which the tab extends in a spaced parallel relationship with respect to the base when the lid is in the closed position.

6. The storage container defined in claim 5 in which the rib means includes a plurality of ribs, each formed with a shelf for supporting the edge of the disc, said shelves lying in a plane parallel with and spaced from the base.

7. The storage container defined in claim 6 in which the tab lies in a plane spaced from and parallel with the plane of the shelves when the lid is in the closed position.

8. The storage container defined in claim 7 in which the undercut formed on the post lies substantially in the plane of the rib shelves when the lid is in the closed position.

9. The storage container defined in claim 6 in which at least one of said ribs has a sloped end edge for guiding the peripheral edge of a disc onto a support shelf of said rib.

10. The storage container defined in claim 1 in which the storage container is a one-piece transparent plastic member.

11. A storage container for a disc which contains recorded information on at least one surface thereof, and a peripheral edge, said container including:

a housing having a base and a closure lid forming a storage compartment therebetween;

hinge means for movably mounting the lid on the base for movement between open and closed positions;

rib means formed on the housing and extending into the storage compartment for supporting first portions of the peripheral edge of a disc to be stored therein, said rib means including at least four ribs spaced approximately 90° from each other;

post means formed on the housing for trapping a second portion of the peripheral edge of the disc; and tab means formed on the hinge means for engaging a third portion of the peripheral edge of the disc when the lid is in the closed position on the base, and in combination with the post means and rib means, secure the disc in the storage compartment.

12. The storage container defined in claim 11 in which two of the ribs have sloped front edges for guiding the disc onto a supporting shelf formed on said two ribs.

* * * * *